(12) United States Patent
Hilldore et al.

(10) Patent No.: US 11,131,857 B2
(45) Date of Patent: Sep. 28, 2021

(54) DYNAMIC CALIBRATION OF OPTICAL PROPERTIES OF A DIMMING ELEMENT

(71) Applicant: Gentex Corporation, Zeeland, MI (US)

(72) Inventors: Benjamin B. Hilldore, Holland, MI (US); Tom B. Sherman, Ada, MI (US); Kurtis L. Geerlings, Zeeland, MI (US); Adam R. Heintzelman, Grand Rapids, MI (US); Keith W. Bigoness, Grand Rapids, MI (US); Donald L. Bareman, Zeeland, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 315 days.

(21) Appl. No.: 16/018,263

(22) Filed: Jun. 26, 2018

(65) Prior Publication Data
US 2018/0373048 A1    Dec. 27, 2018

Related U.S. Application Data

(60) Provisional application No. 62/524,963, filed on Jun. 26, 2017.

(51) Int. Cl.
| | |
|---|---|
| *G02B 27/09* | (2006.01) |
| *H04N 5/225* | (2006.01) |
| *H04N 5/232* | (2006.01) |
| *G02B 5/30* | (2006.01) |
| *B60R 1/00* | (2006.01) |

(Continued)

(52) U.S. Cl.
CPC ............ *G02B 27/0955* (2013.01); *B60R 1/00* (2013.01); *G02B 5/3025* (2013.01); *H04N 5/2252* (2013.01); *H04N 5/2254* (2013.01); *H04N 5/2257* (2013.01); *H04N 5/238* (2013.01); *H04N 5/23296* (2013.01); *H04N 17/002* (2013.01); *B60R 2300/402* (2013.01)

(58) Field of Classification Search
CPC ...................... B60R 2300/402; H04N 5/2254
See application file for complete search history.

(56) References Cited

U.S. PATENT DOCUMENTS

| | | |
|---|---|---|
| 3,659,307 A | 5/1972 | Vitou |
| 4,063,258 A | 12/1977 | Allen |

(Continued)

FOREIGN PATENT DOCUMENTS

| | | | | |
|---|---|---|---|---|
| DE | 102008042012 A1 * | 3/2010 | ........... | H04N 17/002 |
| DE | 102011084690 A1 * | 4/2013 | ............. | G01C 11/00 |

(Continued)

OTHER PUBLICATIONS

Extended European Search Report dated Mar. 30, 2020 for corresponding EP Application 18824601.1, 8 Pages.

*Primary Examiner* — Mainul Hasan
(74) *Attorney, Agent, or Firm* — Price Heneveld LLP; Bradley D. Johnson

(57) ABSTRACT

An imager assembly including calibration functionality and a housing. An imager is disposed inside the housing. The imager includes a lens assembly. An electro-optic element is disposed on a wall of the housing and operable between a substantially clear condition and a substantially darkened condition. A light source directs light at the electro-optic element which redirects the light toward the lens assembly.

16 Claims, 6 Drawing Sheets

(51) Int. Cl.
    *H04N 17/00* (2006.01)
    *H04N 5/238* (2006.01)

(56) References Cited

U.S. PATENT DOCUMENTS

| | | | |
|---|---|---|---|
| 4,410,563 | A | 10/1983 | Richter et al. |
| 4,621,785 | A | 11/1986 | Embra |
| 4,699,478 | A | 10/1987 | Tsui et al. |
| 4,736,218 | A | 4/1988 | Kutman |
| 5,068,770 | A | 11/1991 | Baziuk |
| 5,121,200 | A | 6/1992 | Choi |
| 5,315,333 | A | 5/1994 | Nash |
| 5,418,567 | A | 5/1995 | Boers et al. |
| 5,619,036 | A | 4/1997 | Salvio et al. |
| 5,760,828 | A | 6/1998 | Cortes |
| 5,761,556 | A | 6/1998 | Ichino |
| 5,833,101 | A | 11/1998 | Watkins |
| 6,138,319 | A | 10/2000 | Benoit |
| 6,333,759 | B1 | 12/2001 | Mazzilli |
| 6,536,961 | B1 | 3/2003 | Gillies |
| 6,580,373 | B1 | 6/2003 | Ohashi |
| 6,607,606 | B2 | 8/2003 | Bronson |
| 6,619,806 | B2 | 9/2003 | Akami et al. |
| 6,731,867 | B1 | 5/2004 | Sherwin |
| 6,911,997 | B1 | 6/2005 | Okamoto et al. |
| 7,104,657 | B2 | 9/2006 | Sherwin |
| 7,111,996 | B2 | 9/2006 | Seger et al. |
| 7,245,207 | B1 | 7/2007 | Dayan et al. |
| 7,265,656 | B2 | 9/2007 | McMahon et al. |
| 7,355,629 | B2 | 4/2008 | Lang et al. |
| 7,387,454 | B2 | 6/2008 | Kikuchi et al. |
| 7,448,812 | B2 | 11/2008 | Heibel |
| 7,499,100 | B2 | 3/2009 | Miyazaki et al. |
| 7,579,939 | B2 | 8/2009 | Schofield et al. |
| 7,609,961 | B2 | 10/2009 | Park |
| 7,630,624 | B2 | 12/2009 | Chang |
| 7,813,639 | B2 | 10/2010 | Yoneji |
| 7,881,496 | B2 * | 2/2011 | Camilleri .............. B60R 1/00 382/104 |
| 7,883,064 | B2 | 2/2011 | Luft et al. |
| 7,891,886 | B2 | 2/2011 | Schuetz |
| 7,965,336 | B2 | 6/2011 | Bingle et al. |
| 8,031,224 | B2 | 10/2011 | Linsenmaier et al. |
| 8,077,406 | B2 | 12/2011 | Hachitani et al. |
| 8,118,501 | B2 | 2/2012 | Buschmann |
| 9,229,104 | B2 | 1/2016 | Klar et al. |
| 9,838,653 | B2 | 12/2017 | Fish, Jr. et al. |
| 9,849,836 | B2 | 12/2017 | Minikey, Jr. et al. |
| 2005/0275738 | A1 | 12/2005 | Arai |
| 2006/0171704 | A1 | 8/2006 | Bingle et al. |
| 2006/0238318 | A1 | 10/2006 | Brouwer et al. |
| 2006/0256459 | A1 | 11/2006 | Izabel et al. |
| 2007/0132610 | A1 | 6/2007 | Guemalec et al. |
| 2007/0182817 | A1 | 8/2007 | Briggance |
| 2007/0201616 | A1 | 8/2007 | Rowlands et al. |
| 2007/0223899 | A1 | 9/2007 | Snow |
| 2007/0236569 | A1 | 10/2007 | Lin |
| 2007/0247611 | A1 * | 10/2007 | Tamaki ................ B60R 1/00 356/3.11 |
| 2007/0279610 | A1 * | 12/2007 | Viinikanoja ........... G02B 7/08 355/55 |
| 2009/0122141 | A1 | 5/2009 | Nakamura et al. |
| 2009/0250533 | A1 | 10/2009 | Akiyama et al. |
| 2010/0118145 | A1 | 5/2010 | Betham et al. |
| 2010/0277379 | A1 | 11/2010 | Lindackers et al. |
| 2011/0033663 | A1 | 2/2011 | Svec et al. |
| 2011/0037863 | A1 | 2/2011 | Mihota et al. |
| 2011/0141281 | A1 | 6/2011 | Barefoot et al. |
| 2011/0317298 | A1 | 12/2011 | Van Stiphout |
| 2013/0194426 | A1 * | 8/2013 | Schofield ............... B60R 1/00 348/148 |
| 2013/0229523 | A1 | 9/2013 | Higgins-Luthman et al. |
| 2014/0111684 | A1 | 4/2014 | Corbin et al. |
| 2014/0253731 | A1 | 9/2014 | Suman et al. |
| 2016/0191863 | A1 | 6/2016 | Minikey, Jr. et al. |
| 2016/0200264 | A1 | 7/2016 | Bingle et al. |
| 2017/0075673 | A1 * | 3/2017 | Stein ..................... G03B 17/02 |
| 2017/0136959 | A1 * | 5/2017 | Denny .................. G07C 5/0866 |
| 2018/0091779 | A1 | 3/2018 | Hendricks |
| 2018/0249051 | A1 * | 8/2018 | Send ..................... H04N 5/2254 |

FOREIGN PATENT DOCUMENTS

| | | | | |
|---|---|---|---|---|
| EP | 1006486 | A2 | 6/2000 | |
| EP | 1227683 | A1 | 7/2002 | |
| EP | 1580092 | A2 * | 9/2005 | ............. G03B 17/02 |
| EP | 1529688 | B1 | 2/2007 | |
| EP | 2490175 | A1 * | 8/2012 | ............. G06T 7/80 |
| EP | 2999207 | A1 * | 3/2016 | ............ G01J 1/4204 |
| KR | 100909368 | B1 | 7/2009 | |
| KR | 101134305 | B1 | 4/2012 | |
| KR | 101343814 | B1 | 12/2013 | |

\* cited by examiner

DYNAMIC CALIBRATION OF OPTICAL PROPERTIES OF A DIMMING ELEMENT

CROSS-REFERENCE TO RELATED APPLICATION

This application claims priority to and the benefit under 35 U.S.C. § 119(e) of U.S. Provisional Application No. 62/524,963, filed on Jun. 26, 2017, entitled "DYNAMIC CALIBRATION OF OPTICAL PROPERTIES OF A DIMMING ELEMENT," the disclosure of which is hereby incorporated herein by reference in its entirety.

TECHNOLOGICAL FIELD

The present invention generally relates to imager assemblies and utilizing dynamic calibration assemblies to adjust optical properties of captured images.

SUMMARY OF THE DISCLOSURE

In one aspect of the present disclosure, an imager assembly comprises a housing and an imager disposed inside the housing. The imager includes a lens assembly. An electro-optic element is disposed on a wall of the housing and is operable between a substantially clear condition and a substantially darkened condition. A light source directs light at the electro-optic element which redirects the light toward the lens assembly.

In another aspect of the present disclosure, a method of calibrating an imager assembly comprises positioning an imager to take images through an electro-optic element. The imager is synchronized with a light source such that every Nth frame is used as a calibration frame. The light source is activated during the calibration frame. An image is stored during activation of the light source and properties are compared with a baseline profile to determine color and intensity shift of the electro-optic element.

In yet another aspect of the present disclosure, a method of calibrating an imager assembly comprises positioning an imager to take images through an electro-optic element. The imager is aligned with the electro-optic element such that a dimming region and a calibration region are defined within a field of view of the imager. A color and intensity shift of the image is compared at the calibration region with a color and intensity shift of the image taken through the electro-optic element.

In yet another aspect of the present disclosure, an imager assembly comprises a housing and a primary imager disposed inside the housing. The primary imager includes a lens assembly. An electro-optic element is disposed adjacent to the lens assembly within the housing and is operable between a substantially clear condition and a substantially darkened condition. A calibration imager is disposed within the housing and is configured to collect image data from a calibration light source, wherein a portion of the electro-optic element is disposed between the calibration imager and the calibration light source.

In yet another aspect of the present invention, a method of calibrating an imager assembly comprises positioning a primary imager to take images through an electro-optic element. A calibration imager is positioned to take images of image data provided by a calibration light source through an electro-optic element. Properties of the image are compared with a baseline profile to determine color and intensity shift of the electro-optic element.

These and other features, advantages, and objects of the present invention will be further understood and appreciated by those skilled in the art by reference to the following specification, claims, and appended drawings.

DETAILED DESCRIPTION

Figure 1:
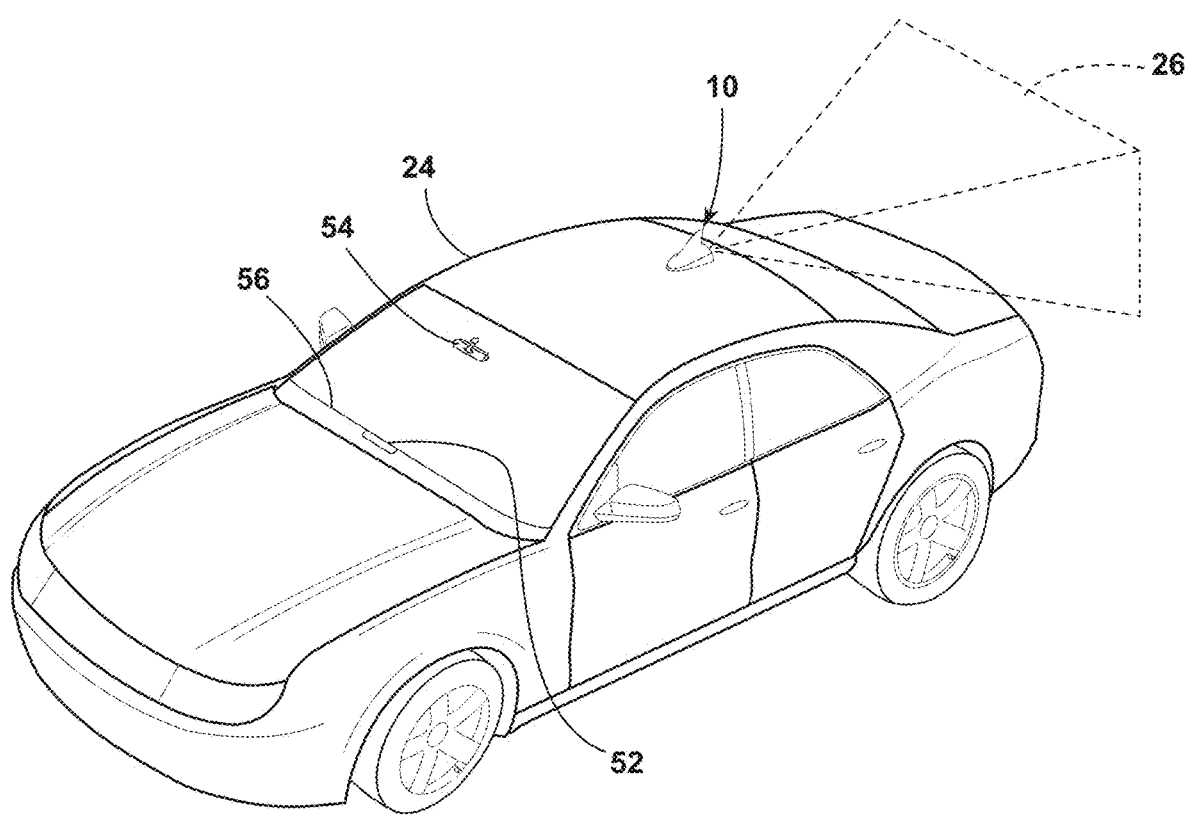
FIG. 1 is a top perspective view of a vehicle with an imager assembly installed inside a housing of a roof mounted antenna of the present disclosure.
Figure 1A:
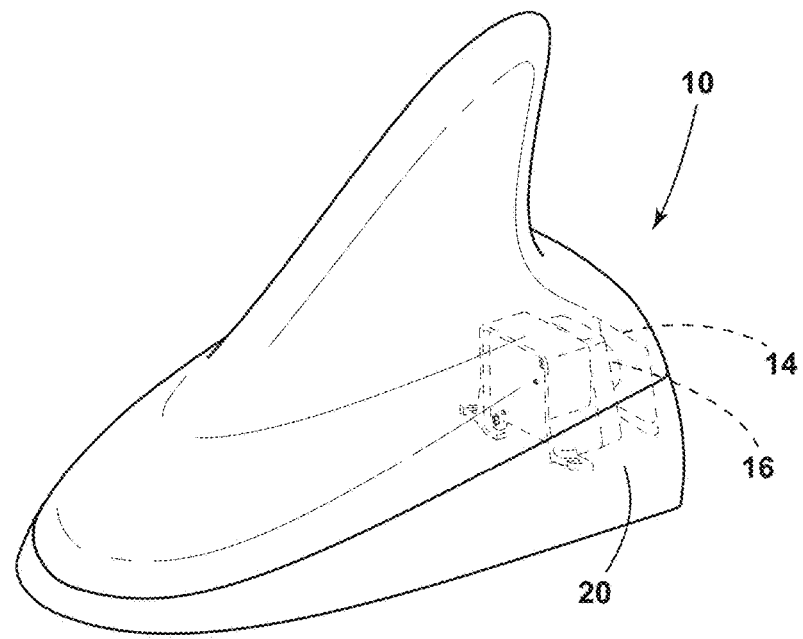
FIG. 1A is a front top perspective view of the roof mounted antenna and imager assembly of FIG. 1.

The present illustrated embodiments reside primarily in combinations of method steps and apparatus components of the imager assembly. The apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
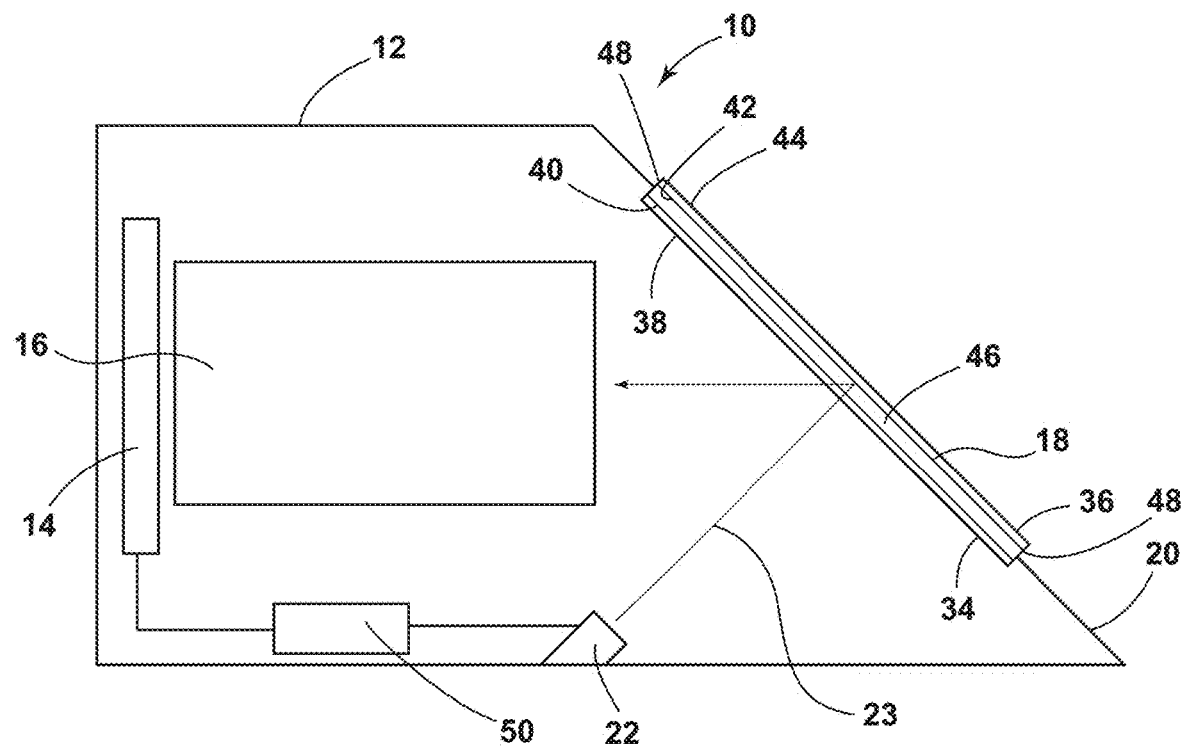
FIG. 2 is a schematic view of an imager assembly of the present disclosure.

Referring to FIGS. 1-2, the reference numeral 10 generally designates an imager assembly that includes a housing 12 and an imager 14 disposed inside the housing 12. The imager 14 includes a lens assembly 16. An electro-optic element 18 is disposed on a wall 20 of the housing 12 and is operable between a generally clear condition and a generally darkened condition. A light source 22 directs light 23 at the electro-optic element 18, and the electro-optic element 18 redirects the light toward the lens assembly 16.

The housing 12 may be constructed from a variety of materials including metals and plastics, and may be disposed inside or outside of a vehicle 24. As illustrated, the imager assembly constructions set forth herein may be disposed in a satellite antenna housing, behind a vehicle body panel, etc., and are not limited to the specific configurations illustrated herein. Although the imager assembly 10 includes a field of view 26 that is directed rearwardly, the field of view 26 could extend in any direction relative to the vehicle. In the illustrated embodiment, the wall 20 of the housing 12 includes an at least partially transmissive and partially reflective portion, which in the illustrated embodiment includes the electro-optic element 18. The electro-optic element 18 includes first and second substrates 34, 36. The first substrate 34 defines a first surface 38 and a second surface 40. The second substrate 36 defines a third surface 42 and a fourth surface 44. An electro-optic medium 46 is disposed between the first substrate 34, the second substrate 36, and seals 48 are disposed about the dimming element. The third surface 42 and/or the fourth surface 44 may include a transflective coating to allow external light to pass into the housing 12, but reflect internal light from the light source 22. However, in some instances, the transflective coating may be on the first surface 38 or second surface 40.

With reference again to FIG. 2, the light source 22 is disposed below the imager 14 and the lens assembly 16. However, it will be understood that the light source 22 may be disposed at other areas within the housing 12. Regardless, the light source 22 is generally configured to direct the light 23 at the electro-optic element 18, which redirects the light toward the lens assembly 16. The imager assembly 10 is generally configured such that the imager 14 is synchronized with the light source 22, such that every Nth frame taken by the imager 14 is used as a calibration frame by a controller 50 and is not displayed to the user. The light source 22 is pulsed on during the calibration frame and image data is captured by the imager 14. The controller 50 then compares a color of the image to a baseline image profile to determine if there has been any color or intensity shift of the electro-optic element 18. An algorithm configured to compensate for color and intensity shift runs within a processor of the controller 50 that is in electrical communication with the imager 14. The processor subsequently modifies the image data before being displayed to a user on a display module 52. The display module may be positioned anywhere including inside the vehicle 24 at a rearview device 54 or dash 56, or outside of the vehicle 24.

With reference again to FIGS. 1-2, it will be understood that the Nth frame may be as frequent as every other frame taken by the imager 14, but could also be as infrequent as every 30 seconds a frame is used for calibration. In addition, it is also contemplated that the sampling rate could be based on the voltage differential measured at the electro-optic element 18. As the voltage differential increases, the sampling rate may increase as the electro-optic element 18 may be darkening or becoming more clear. In addition, it is generally contemplated that the sampling rate may be based on the time of day (dusk and dawn), the time of year, or the state of use of the vehicle (whether the vehicle is in drive, reverse, park, etc.).

A method of using calibration functionality of the imager assembly 10 includes positioning the imager 14 to take images through the electro-optic element 18. The imager 14 is then synchronized with the light source 22, such that every Nth frame is used as a calibration frame. The light source 22 is activated during each calibration frame. Image data is captured by the imager 14 and stored in memory during activation of the light source 22, and properties of the image are compared with a baseline image profile to determine color and intensity shift of the electro-optic element 18. As noted above, a transflective coating may be applied to one of the first, second, third, and fourth surfaces 38, 40, 42, 44 of the first and second substrates 34, 36 of the electro-optic element 18 to allow external light to pass into the housing 12, but reflect internal light that is provided by the light source 22. In addition, it is also contemplated that a reflective polarizer may be positioned adjacent to the electro-optic element 18 to allow light to pass into the housing 12, but minimize light from leaving the housing 12.

Figure 3:
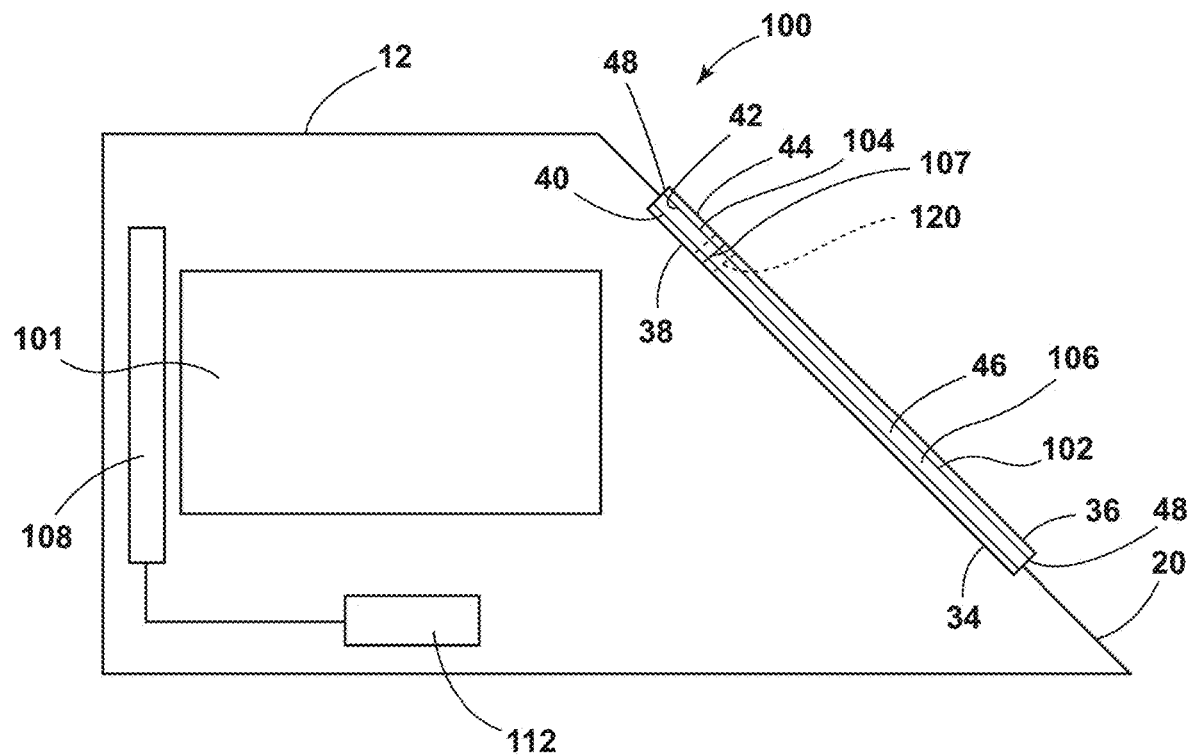
FIG. 3 is a schematic view of another imager assembly of the present disclosure.
Figure 4:
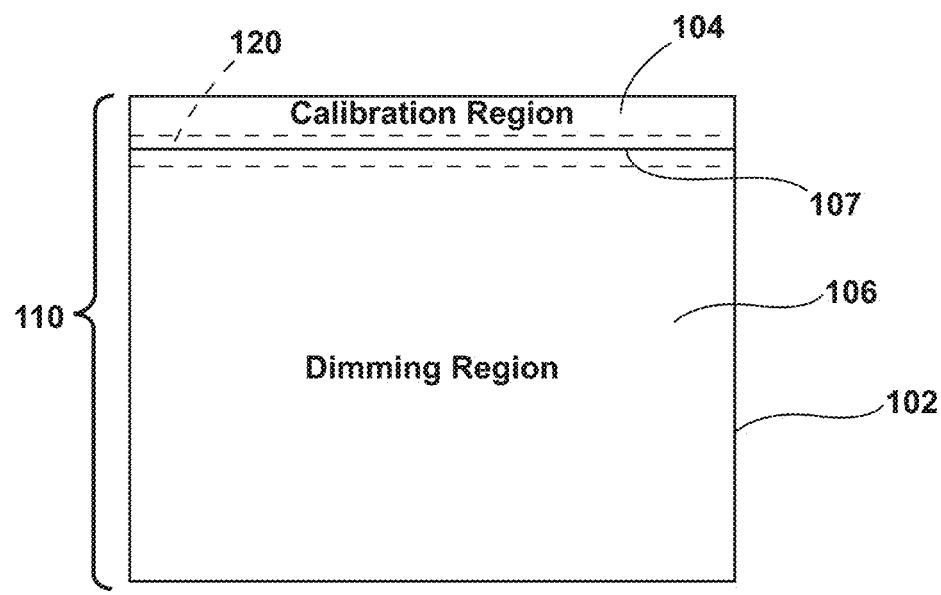
FIG. 4 is a schematic view of a calibration region and dimming region of an imager assembly of the present disclosure.
Figure 5:
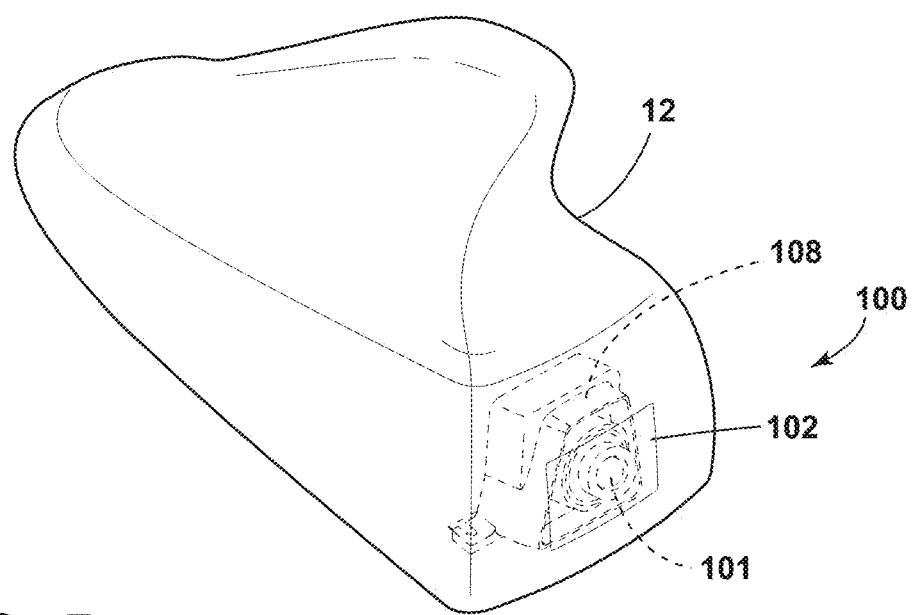
FIG. 5 is a rear top perspective view of a roof mounted antenna and imager assembly of the present disclosure.
Figure 6:
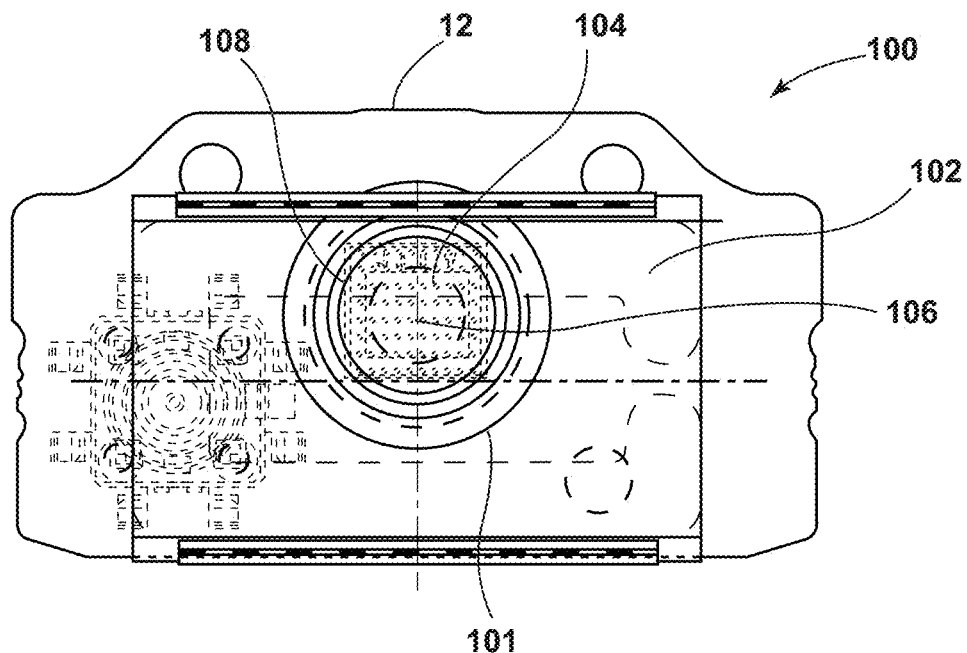
FIG. 6 is a front schematic view of an imager assembly of the present disclosure.
Figure 7:
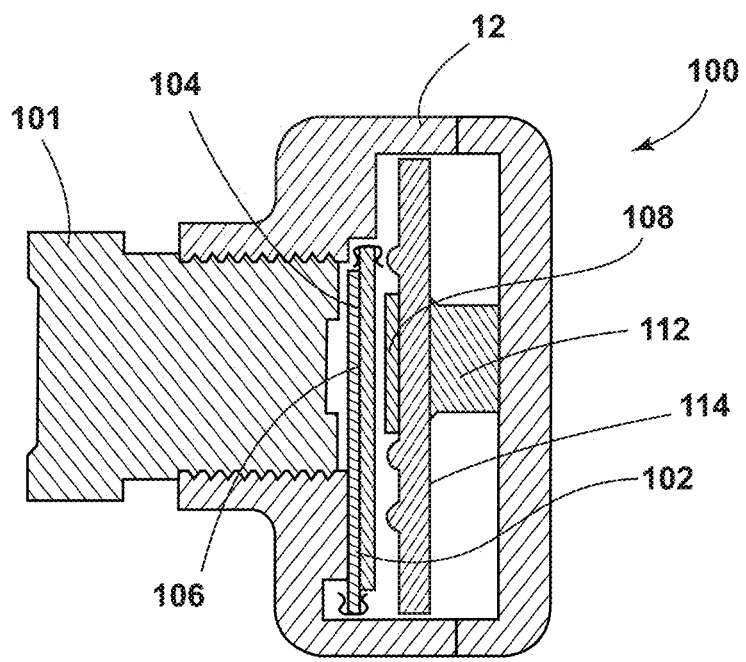
FIG. 7 is a side cross-sectional elevational view of an imager of the present disclosure.

With reference now to FIGS. 3-7, in an alternate construction, an imager assembly 100 is illustrated that includes another manner of calibration. This configuration uses many of the same features as the previously described construction. It will be understood that like features include like references numerals across the various embodiments set forth in this disclosure. The imager assembly 100 also includes a lens assembly 101 and an electro-optic element 102. The electro-optic element 102 includes a calibration region 104, and a dimming region 106 separated by a seal 107. The electro-optic medium 46 at the dimming region 106 and at the calibration region 104 may be constructed from the same or different materials. It is contemplated that the seal 107 may be generally clear in some applications. The calibration region 104 does not dim and is generally clear. In this instance, an imager 108 is positioned to capture image data through an electro-optic element 102. The electro-optic element 102 may be positioned inside the housing 12 (FIG. 7) or may be positioned at an opening defined by the housing 12 (FIG. 3). Regardless, the imager 108 is aligned with the electro-optic element 102, such that the dimming region 106 and the calibration region 104 define an area 110 that is aligned with the field of view 26 of the imager 108. The calibration region 104 will likely be a small portion of the overall area 110 of the electro-optic element 102. Depending on the application, the calibration region 104 may be on a top, bottom, or side of the electro-optic element 102. In addition, the calibration region 104 may be positioned such that the calibration region 104 will not be visible on the display module 52 disposed within the vehicle 24 that provides image data to the user. The controller 112 compares a color and intensity shift of the image at the calibration region with a color and intensity shift of the image taken at the dimming region 106 of the electro-optic element 102. The controller 112 may be positioned on a circuit board 114. An algorithm is subsequently activated to modify the image based on the comparison of the calibration region 104 with the dimming region 106. The modified image is then displayed on the display module 52 to a user.

With reference again to FIGS. 3-7, it will be understood that color and intensity shift properties of the dimming region 106 and the calibration region 104 may be stored in non-volatile memory of the imager 108. This data may be recalled by the controller 112 that evaluates the color and intensity shift of the dimming region 106 and the calibration region 104 at a later time. The seal 107 may be disposed between the calibration region 104 and the dimming region 106. In addition, a dead zone area 120 may be identified between the calibration region 104 and the dimming region 106. Image data that is captured at the dead zone area 120 may be discarded by the controller 112 and not utilized in evaluating any color or intensity shift. In addition, the controller 112 in this construction may include real-time content aware identification of the suitability of pixels for use in calibration. Stated differently, the controller 112 may run an algorithm that measures for similarities and/or differences in the calibration and dimming regions 104, 106 and these similarities and differences may be used for calibration of the dimming region 106.

Figure 8:
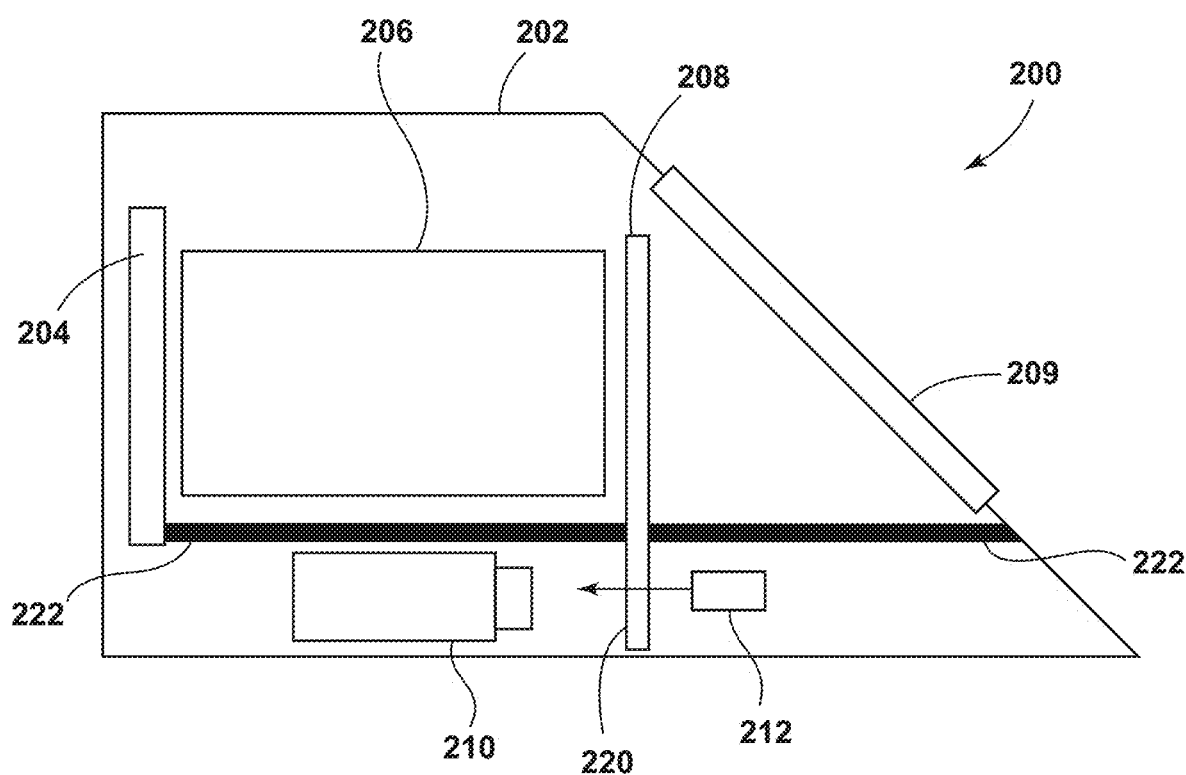
FIG. 8 is a schematic view of another imager assembly of the present disclosure.

With reference now to FIG. 8, yet another configuration set forth in this disclosure includes an imager assembly 200 with calibration functionality. The imager assembly 200 includes a housing 202, and a primary imager 204 disposed within the housing 202. The primary imager 204 includes a lens assembly 206 and an electro-optic element 208 that is disposed adjacent to the lens assembly 206. The electro-optic element 208 may include a structure similar to that of the electro-optic element 18 disclosed above and illustrated in FIG. 2. The electro-optic element 208 and the lens assembly 206 are disposed within the housing 202 behind a cover glass 209. The electro-optic element 208 includes features similar to those set forth in relation to the electro-optic element 18. The lens assembly 206 is disposed between the primary imager 204 and the electro-optic element 208. The electro-optic element 208 is operable between a generally clear condition and a generally darkened or dim condition. A calibration imager 210 is also disposed within the housing 202 and is configured to collect image data from a calibration light source 212. A portion of the electro-optic element 208 is disposed between the calibration imager 210 and the calibration light source 212. In this instance, a periodic or continual calibration of the image data occurs based on image data collected by the calibration imager 210. While the user is able to see image data collected by the primary imager 204 through the electro-optic element 208, the image data is modified based on an algorithm that functions to modify the image before being displayed to a user based on image data collected by the calibration imager 210. For example, in the event the primary imager 204 is being used in very bright, ambient conditions, the electro-optic element 208 will dim. As the electro-optic element 208 dims, the calibration light source 212 directs light through the electro-optic element 208 at the calibration imager 210. If the color and intensity of the electro-optic element 208 shifts as noted by the calibration imager 210, modifications can be made by the image data collected by the primary imager 204 before being displayed to the user.

With reference again to FIG. 8, the lens assembly 206 is shown between the primary imager 204 and the electro-optic element 208. However, the electro-optic element 208 could also be positioned between the primary imager 204 and the lens assembly 206. This construction for the imager assembly 200 would work similarly to the illustration of FIG. 8, but image data would be adjusted based on light first passing through the lens assembly 206, then the electro-optic element 208 before being captured by the primary imager 204.

One method of calibrating the imager assembly 201 using the imager assembly 200 includes positioning the primary imager 204 to take images through the electro-optic element 208. The calibration imager 210 also takes images of image data that is provided by the calibration light source 212 through the electro-optic element 208. Properties of the image data are then compared with a baseline image profile to determine color and intensity shift of the electro-optic element 208. The calibration functionality of the imager assembly 200 may utilize a separate calibration region 220 (between the calibration imager 210 and the calibration light source 212) on the electro-optic element 208 to provide a reference for correction. The calibration region 220 is analyzed by a separate imaging device (the calibration imager 210) altogether. An optical isolator 222 extends across the housing 202 and is interrupted by the electro-optic element 208. The optical isolator 222 is configured to isolate the primary imager 204, the lens assembly 206, and a primary portion of the electro-optic element 208 from optical overlap with the calibration imager 210 and the calibration light source 212. The purpose of the optical isolation is to prevent light from the calibration light source 212 from reaching the primary imager 204 and also to prevent external light from reaching the calibration imager 210.

Figure 9:
FIG. 9 is an exemplary image of optical properties of baseline image data.
Figure 10:
FIG. 10 is an exemplary image of image data collected through a dimmed electro-optic.
Figure 11:
FIG. 11 is an exemplary image of image data collected through a dimmed electro-optic after the electro-optic has been compensated for color and intensity shift.

With reference now to FIGS. 9-11, an example of corrected images can be observed. Specifically, a baseline image is shown in FIG. 9. After the electro-optic element is dimmed, a color and intensity shift occurs as a result of the image data being collected through the electro-optic element (FIG. 10). After compensation, which is governed by an algorithm within a processor of the controller disposed within the imager assembly or elsewhere within the system, the image can be displayed to the user (FIG. 11).

The color correction applied in these techniques is configured to allow the presence of a dimming element as part of an imager stack-up without negatively affecting image quality. One application of this technique is to allow the dimming element to act as a gain factor in the imaging device to allow more flexibility and exposure control settings. Consequently, this can be used to improve dynamic range capabilities and allow for greater ability to mitigate the effect of time varying light sources on the imager.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imager assembly including calibration functionality, the imager assembly comprising:
    a housing;
    an imager disposed inside the housing, the imager including a lens assembly defining a field of view of the imager;
    an electro-optic element optically coupled with the housing, the electro-optic element including a dimming region operable between a clear condition and a darkened condition, and a calibration region within the field of view of the imager;
    a controller operably coupled with the imager and electro-optic element, the controller configured to run an algorithm that measures the differences between the color and intensity of the image at the calibration region and the color and intensity of the image at the dimming region so that adjustment can be made to the dimming region; and
    a seal disposed between the dimming region and calibration region, the seal disposed of a dead zone area;
    wherein the controller is configured to discard image data captured in the dead zone area.

2. The imager assembly of claim 1, wherein the electro-optic element is disposed in an opening defined by the housing and wherein a transflective coating applied to a surface of the electro-optic element to allow external light to pass into the housing.

3. The imager assembly of claim 1, further comprising:
    a reflective polarizer adjacent to the electro-optic element.

4. The imager assembly of claim 1, wherein the imager is disposed inside a satellite antenna housing external to a vehicle.

5. The imager assembly of claim 1, wherein the seal is at least partially clear.

6. The imager assembly of claim 1, further comprising:
    a display module that displays image data captured by the imager.

7. The imager assembly of claim 6, wherein the display module only shows captured image data taken through the dimming region.

8. An imager assembly including calibration functionality, the imager assembly comprising:
    a housing;
    an imager disposed inside the housing, the imager including a lens assembly defining a field of view of the imager;
    an electro-optic element disposed within the housing, the electro-optic element including a dimming region operable between a clear condition and a darkened condition, a calibration region within the field of view of the imager; and a seal disposed between the dimming region and the calibration region, wherein the seal comprises a dead zone area; and
    a controller operably coupled with the imager and electro-optic element, the controller configured to run an algorithm that measures the differences between the color and intensity of the image at the calibration region and the color and intensity of the image at the dimming region so that adjustment can be made to the dimming region;
    wherein the controller is configured to discard image data captured in the dead zone area.

9. The imager assembly of claim 8, further comprising:
    a transflective coating applied to a surface of the electro-optic element to allow external light to pass into the housing.

10. The imager assembly of claim 8, further comprising:
    a reflective polarizer adjacent to the electro-optic element.

11. The imager assembly of claim 8, wherein the seal is at least partially clear.

12. The imager assembly of claim 8, further comprising:
    a display module that displays image data captured by the imager.

13. The imager assembly of claim 12, wherein the display module only shows captured image data taken through the dimming region.

14. A method of calibrating an imager assembly, the method comprising:
    positioning an imager to take images through an electro-optic element;
    aligning the imager with the electro-optic element such that a dimming region and a calibration region are defined within a field of view of the imager;
    identifying a dead zone between the calibration region and the dimming region;
    discarding, by a controller, image data captured in the dead zone; and
    comparing, by the controller, a color and intensity shift of the image at the calibration region with a color and intensity shift of the image taken through the electro-optic element in the dimming region.

15. The method of claim 14, including storing calibration region and dimming region color and intensity properties in non-volatile memory that is in electrical communication with the imager.

16. The method of claim 14, including identifying real-time content for suitability of pixels for use in calibration to determine one of similarities and differences between the calibration region and the dimming region.

\* \* \* \* \*